UNITED STATES PATENT OFFICE.

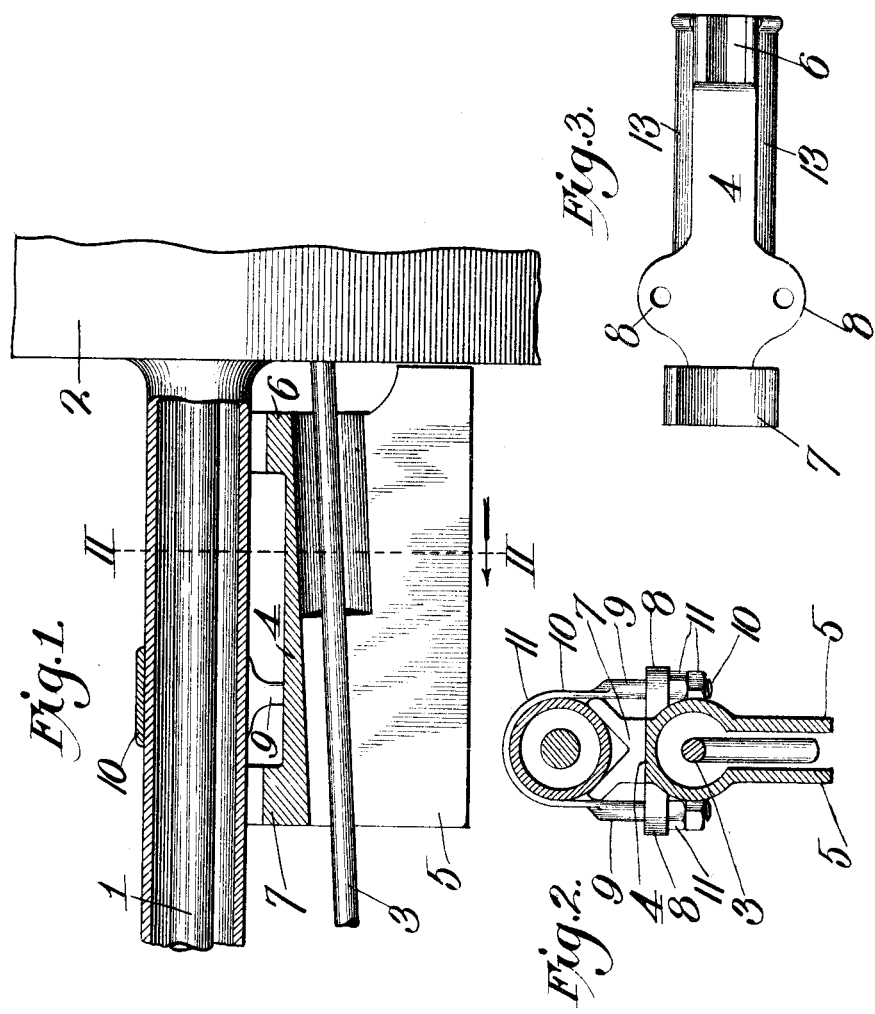

HARRY C. EDWARDS, OF KANSAS CITY, MISSOURI, ASSIGNOR OF ONE-HALF TO JOHN T. MEGREDY, OF KANSAS CITY, MISSOURI.

JACK-ENGAGING REAR-AXLE BRACKET.

1,137,002.  Specification of Letters Patent. Patented Apr. 27, 1915.

Application filed March 14, 1914. Serial No. 824,795.

*To all whom it may concern:*

Be it known that I, HARRY C. EDWARDS, citizen of the United States, residing at Kansas City, in the county of Jackson and State of Missouri, have invented certain new and useful Improvements in Jack-Engaging Rear-Axle Brackets, of which the following is a specification.

This invention relates to jack engaging rear axle brackets for automobiles, and my object is to produce a bracket which can be easily and quickly secured to the rear axle of any automobile and which will accommodate the truss rods if the axle is equipped therewith and which will also accommodate the turn buckle of the truss rod if disposed near the outer end of the latter.

With this general object in view, the invention consists in certain novel and peculiar features of construction and organization as hereinafter described and claimed; and in order that it may be fully understood reference is to be had to the accompanying drawing, in which—

Figure 1, is a view of a part of a rear axle and rear axle truss rod of an automobile, and also shows one of my attachments in vertical longitudinal section. Fig. 2, is a section on the line II—II of Fig. 1. Fig. 3, is a plan view of one of the brackets.

In the said drawings, 1 indicates the rear axle, 2 one of the brake drums, and 3 the truss rod of an automobile and in order that said axle may be in effect lowered to substantially the same horizontal plane as the front axle (not shown) so that both axles may be simultaneously engaged by a lifting jack, (not shown) which is capable of lifting an automobile bodily if desired, I provide a bracket at each end of the rear axle comprising essentially a top portion 4, and depending substantially parallel side portions 5. Each of these brackets is arranged under and longitudinally of the rear axle, and to guard against lateral creepage or slippage, forked lugs 6 and 7 project upwardly from opposite ends of the top portion 4 and form the direct support of the axle, and to clamp the bracket firmly to the axle, the former is provided with laterally projecting perforated ears 8 to receive the threaded stems 9 of a U-shaped clip 10 fitted over the axle, nuts 11, engaging the lower ends of the stems and the undersides of ears 8 to clamp the bracket rigidly to the axle.

The space between the parallel side portions accommodates the truss rod 3, if the axle is trussed by such rod, and if the members of the truss rod are connected by a turn-buckle located adjacent the brake drum as customary, the outwardly bowed portions 13 of the sides 5 widen the space between said sides sufficiently to accommodate such turn buckle. In this connection it will be noted that the bracket is of considerable length so as to accommodate jacks of different width so that the same jack may be used—at different times of course—to support cars of different sizes.

From the above description it will be apparent that I have produced a jack-engaging rear-axle bracket embodying the features of advantage enumerated as desirable and I wish it to be understood that while I have illustrated one form which my invention may take, I reserve the right to make all changes falling within the spirit and scope of the appended claims.

I claim:

1. The combination with the rear axle of a motor car, of a bracket underlying the axle and comprising a top portion and two side portions spaced apart at opposite sides of the plane of the axis of the axle; said sides having oppositely bowed portions providing a longitudinally extending widened space between them and means securing the bracket rigidly to the axle.

2. A bracket comprising a top portion, substantially parallel sides depending vertically from the side margins of the top portion, forked lugs projecting upwardly from the top portion, and perforated ears projecting laterally from the top portion.

3. A bracket comprising a top portion, substantially parallel sides depending vertically from the side margins of the top portion and provided with oppositely bowed longitudinal portions 13, forked lugs projecting upwardly from the top portion, and perforated ears projecting laterally from the top portion.

In testimony whereof I affix my signature, in the presence of two witnesses.

HARRY C. EDWARDS.

Witnesses:
 HELEN C. RODGERS,
 G. Y. THORPE.

Copies of this patent may be obtained for five cents each, by addressing the "Commissioner of Patents, Washington, D. C."